United States Patent [19]
Rabina et al.

[11] Patent Number: 6,032,034
[45] Date of Patent: Feb. 29, 2000

[54] COMPLETE DIALED NUMBER DETECTION IN WLL TERMINAL WITHOUT SPECIFIED TIME DELAY

[75] Inventors: Ossi Rabina, Tyrnava; Heikki Galla, Oulu, both of Finland

[73] Assignee: Nokia Mobile Phones Limited, Espoo, United Kingdom

[21] Appl. No.: 08/848,688

[22] Filed: Apr. 28, 1997

[51] Int. Cl.[7] ................................................. H04Q 7/20
[52] U.S. Cl. ..................... 455/401; 455/462; 455/557; 455/555
[58] Field of Search ................................... 455/462, 554, 455/555, 400, 401, 402, 564, 565, 561

[56] References Cited

U.S. PATENT DOCUMENTS

| | | | |
|---|---|---|---|
| 4,658,096 | 4/1987 | West, Jr. et al. | 379/59 |
| 4,737,795 | 4/1988 | Shafer | 379/58 |
| 4,775,997 | 10/1988 | West, Jr. et al. | 379/58 |
| 4,922,517 | 5/1990 | West, Jr. et al. | 379/58 |
| 5,799,254 | 8/1998 | Karmi et al. | 455/401 X |

FOREIGN PATENT DOCUMENTS

WO 96/32824  10/1996  WIPO .

*Primary Examiner*—Edward F. Urban
*Assistant Examiner*—Philip J. Sobutka
*Attorney, Agent, or Firm*—Ohlandt, Greeley, Ruggiero & Perle, L.L.P.

[57] ABSTRACT

A WLL subscriber unit (1) that operates in accordance with a method for establishing a call from a telephone (2) that forms a part of a WLL subscriber unit. The method includes the steps of: (a) dialing a first digit of a telephone number; and (b) detecting the first digit and, in response to detecting the first digit, automatically transmitting a message over an RF channel, the transmitted message being a call origination message having a telephone number portion that contains only the first dialed digit. The method further includes the steps of (c) waiting for a response from the network; (d) when the response is received, determining if at least one additional digit has been dialed; and (e) if yes, transmitting a further message over the RF channel, the transmitted further message being another call origination message having a telephone number portion that contains the first dialed digit and the at least one additional dialed digit that is appended to the first dialed digit. When the network response is received, and if the step of determining if at least one additional digit has been dialed is negative, the method includes the further steps of: (f) determining if the network has accepted the call origination message or rejected the call origination message; (g) if the call origination message is rejected, terminating the call establishment; and (h) if the call origination message is accepted, operating the WLL subscriber unit to connect the call between a user and the called party.

6 Claims, 3 Drawing Sheets

COMPLETE DIALED NUMBER DETECTION IN WLL TERMINAL WITHOUT SPECIFIED TIME DELAY

FIELD OF THE INVENTION

This invention relates generally to wireless communications systems and, in particular, to Wireless Local Loop (WLL) telecommunications systems.

BACKGROUND OF THE INVENTION

In data transmission systems an outgoing connection is usually established by a connection code, such as a telephone number. In a conventional fixed line telephone network, each digit of a dialed number is directly transmitted to an exchange as the numbers are dialed. The dialled numbers are analyzed in the exchange, and a connection is established after the dialled number sequence is detected to be a valid, existing telephone number.

In cellular telecommunication systems a number is typically dialled on a keypad and stored in the mobile station (e.g., a cellular telephone or personal communicator). After the dialling is completed a predetermined key (i.e., the SEND key) is depressed to cause the stored number to be transmitted to the system for analysis.

Terminal equipment used in wireless local loop (WLL) networks includes a conventional telephone which can be linked to the public telephone network through a wireless transceiver unit. In many cases the transceiver unit is linked to a cellular system by radio communication.

However, as there is no SEND key available on the conventional telephone, one of the problems encountered in WLL systems has been how to decide when the dialling sequence has been completed.

One previously known solution employs a special end character to indicate the completion of dialling. By example, the end character can be a keypad character (e.g., # or *) which is normally not used for dialling. Depressing the end character key informs the WLL transceiver that dialling has been completed, and that the stored dialed number can be transmitted to a base station of the cellular system. A disadvantage of this solution is, however, that the required dialing procedure differs significantly from that used in conventional fixed networks. Some users may find such differences objectionable.

Another prior art solution has been to use time supervision. According to this approach the elapsed time starting from a last dialled digit is monitored, and after a predetermined time has elapsed (e.g., 6 seconds), the dialing sequence is assumed to have been completed. In response to the occurrence of the timeout the stored dialed sequence of digits is transmitted to the base station as the connection code.

However, one problem with time supervision is that an additional, and considerable, delay is required for the establishment of the connection. This delay is incremental to the time required by the system to actually establish the connection. This problem can be diminished by reducing the predetermined delay time. Reducing the delay time, however, can introduce other problems. For example, the called number dialing sequence may typically be interrupted by the user having to refer to a phone book or some other telephone number record. In this case a delay or pause of several seconds can easily occur between dialed digits. If such a pause in dialing is erroneously interpreted by the WLL terminal equipment as the completion of the dialing sequence, the WLL terminal equipment will transmit an incomplete telephone number to the base station, and the establishment of the connection fails. In this case the user must start the dialing procedure over, and redial the entire number.

In commonly assigned Finnish patent application FI 961330 a technique is described for setting up calls in a WLL system. In this approach the WLL equipment stores each telephone number that is successfully setup. After the number has been stored, a call made to the same number is immediately established when a newly entered number is found to equal a stored number. That is, the system is made aware of when to transmit the call setup request to the network by the newly entered number equalling a previously entered number that is known to have been successful in setting up a call.

Reference can be had to the following U.S. Patents for describing prior art WLL systems: U.S. Pat. Nos. 4,658,096, 4,737,975, 4,775,997, and 4,922,517.

OBJECTS AND ADVANTAGES OF THE INVENTION

It is a first object and advantage of this invention to provide an improved WLL system that overcomes the foregoing and other problems.

It is a second object and advantage of this invention to provide a WLL system that immediately transmits a first call origination message with a first detected dialed digit, and that transmits at least one further call origination message that includes the first and all additionally dialed digits.

SUMMARY OF THE INVENTION

The foregoing and other problems are overcome and the objects of the invention are realized by methods and apparatus in accordance with embodiments of this invention.

In accordance with a method of this invention, and a WLL subscriber unit that operates in accordance with the method, a method for establishing a call from a telephone that forms a part of a WLL subscriber unit includes the steps of: (a) dialing a first digit of a telephone number; and (b) detecting the first digit and, in response to detecting the first digit, automatically transmitting a message over an RF channel, the transmitted message being a call origination message having a telephone number portion that contains only the first dialed digit. The method further includes the steps of (c) waiting for a response from the network; (d) when the response is received, determining if at least one additional digit has been dialed; and (e) if yes, transmitting a further message over the RF channel, the transmitted further message being another call origination message having a telephone number portion that contains the first dialed digit and the at least one additional dialed digit that is appended to the first dialed digit.

When the network response is received, and if the step of determining if at least one additional digit has been dialed is negative, the method includes the further steps of: (f) determining if the network has accepted the call origination message or rejected the call origination message; (g) if the call origination message is rejected, terminating the call establishment; and (h) if the call origination message is accepted, operating the WLL subscriber unit to connect the call between a user and the called party.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
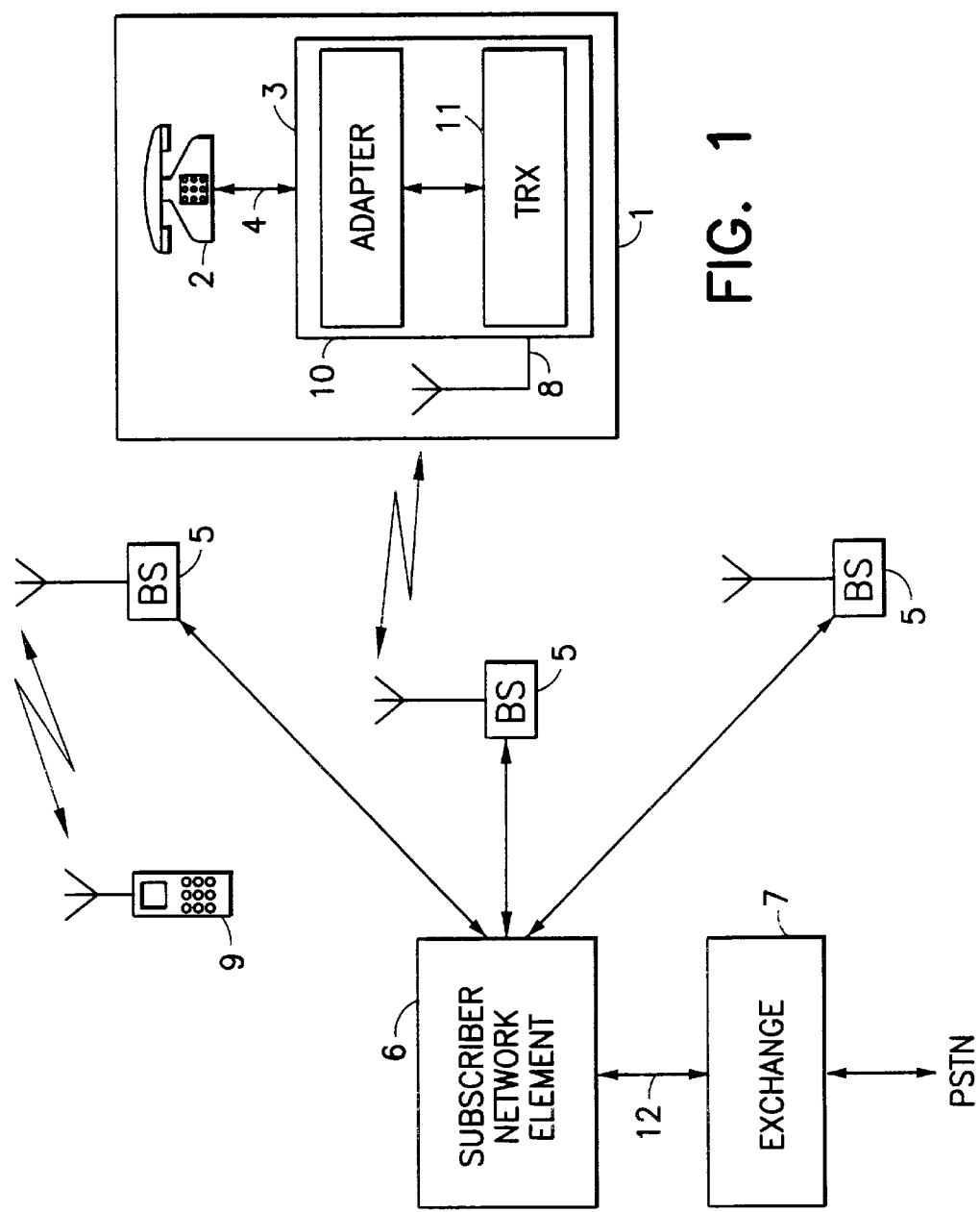
FIG. 1 is block diagram of a WLL system that can be used to practice this invention.

FIG. 1 illustrates a simplified block diagram of a suitable embodiment of a WLL system for practicing this invention. The WLL system shown in FIG. 1 could be based on any suitable mobile telephone system, including both analog (FM modulated) and digital (phase modulated) mobile telephone systems. In the digital embodiment the air interface may use Time Division Multiple Access (TDMA), such as GSM and IS-136 systems, or Code Division Multiple Access (CDMA), such as IS-95. Combinations of access techniques can also be used, as can other access techniques. Base stations 5 are assumed to be operative with the signalling requirements of the air interface standard of choice. Through the base stations 5 and a subscriber network element 6 it is also possible to transmit calls to and from a conventional mobile station 9, and one or WLL systems and a plurality of conventional mobile stations may be simultaneously active within the cells served by the base stations 5.

A WLL subscriber station 1 shown in FIG. 1 includes a telephone 2 and terminal equipment 3. The telephone 2 may be a conventional telephone which may be connected to a fixed telephone network and which uses tone-dialling. The telephone 2 and the terminal equipment 3 are connected by a bidirectional path 4 through which the conventional 2 wire or 4 wire fixed telephone network signals are transmitted. The terminal equipment 3 includes signal processing circuits for adapting the speech path of the telephone 2 to the radio channel. The signal processing circuits include, by example, a radio portion 11 having an antenna 8 and a radio channel transceiver (TRX), as well as a teleadapter 10 for adapting the radio portion 11 to the conventional telephone 2.

The WLL subscriber station 1 is connected to one of the base stations 5 via the antenna 8 by means of radio frequency signals. A call is transmitted from the WLL subscriber station 1 via a base station 5 to the subscriber network element 6 and then to an exchange of a Public Switched Telephone Network (PSTN), that is, to the exchange 7 of a fixed telephone network. In the case of FIG. 1, and by example only, the subscriber network element 6 is connected to the local exchange 7 by means of an open CCITT Q.512 V2-type multiplexer interface 12 employing a 2 Mbit/s PCM (Pulse Code Modulation) system.

Figure 2:
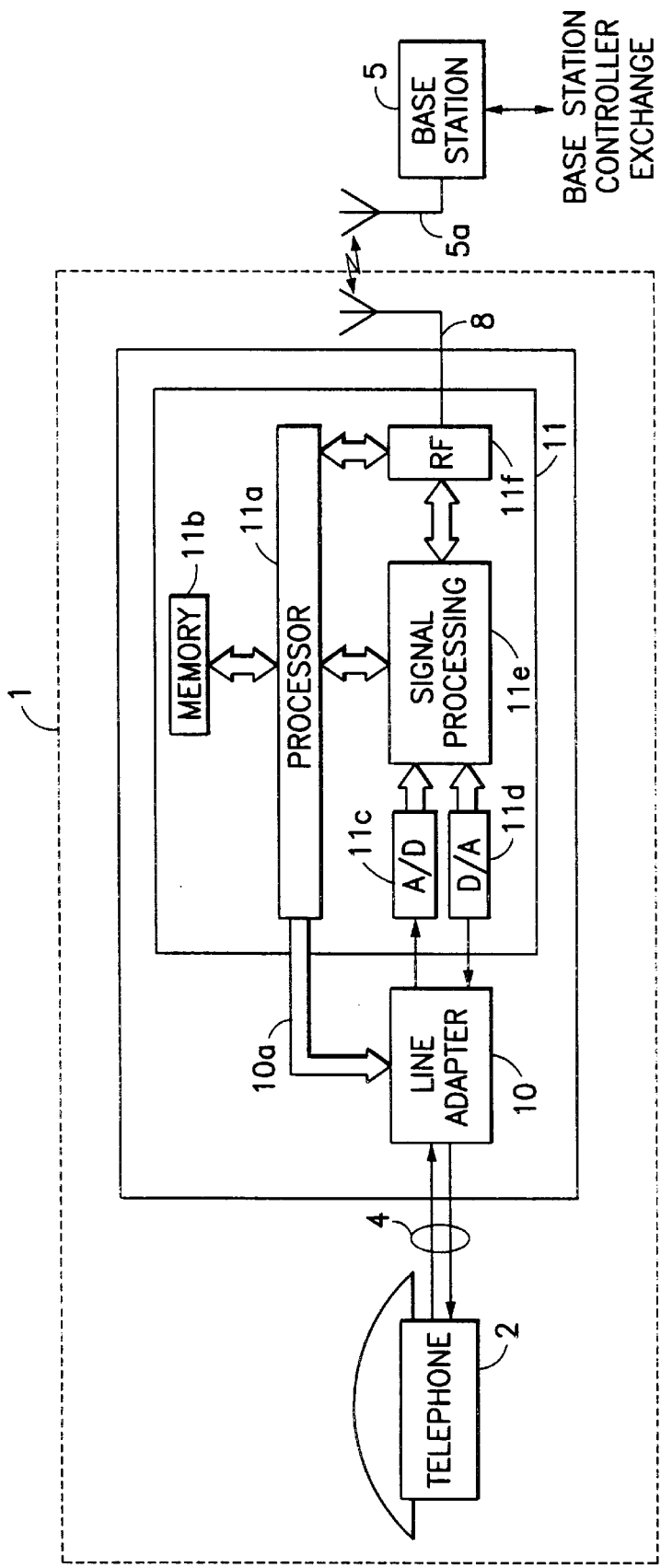
FIG. 2 is a more detailed block diagram of the WLL system of FIG. 1.

FIG. 2 is a more detailed block diagram of the WLL subscriber station 1 and its connection to the data transmission system. The WLL subscriber station 1 includes the conventional telephone 2 that is adaptable to a subscriber connection of a conventional PSTN. The telephone 2 is connected to the TRX 11 via the line or teleadapter 10, through the interface 4.

For the case of a digital radio interface, an analog signal received from the telephone 2 is converted to a digital signal using an A/D converter 11c, the digital signal is input to a signal processing unit 11e, and a transmission signal on a radio frequency is modulated with the produced signal in RF component 11f. The modulated and amplified signal is then input to the antenna 8 for transmission to the antenna 5a of the base station 5.

Similarly, a signal received on a radio frequency is input from the antenna 5 and provided to the RF component 11f where the signal is demodulated. A resulting digital signal output from the RF component 11f is input to the signal processing unit 11e, and the processed digital audio signal is converted to an analog signal using a D/A converter 11d. The signal processing unit 11e is programmed to implement the required transmit and receive signalling and data protocols, including voice coding, error correction, interleaving, etc., in accordance with selected air interface standard.

For the case where the radio interface is based on analog FM modulation, the digital components of blocks 11c–11f are replaced by a suitable FM modulator for signal transmission and a suitable FM demodulator for signal reception.

A telephone for a conventional telephone network uses high voltages (e.g., 60 V) between the telephone and the exchange. In addition, the calling function of such a telephone is based on voltage control. In order to establish a connection the teleadapter 10 is required for interfacing the conventional telephone 2, and its accessories, to the WLL system. The teleadapter 10 produces a line voltage and indicates when the telephone handset is on/off hook. In addition, the formation of dialling signals (and other control signals) can be performed in the teleadapter 10, as can the indication of DTMF signals. The teleadapter 10 can be constructed using known circuits, such as a SLIC (Subscriber Line Interface Circuit). One SLIC suitable for this purpose is a type Am79R79 manufactured by Advanced Micro Devices. The interface 4 between the telephone 2 and the line adapter 10 typically includes two or four conductors.

The operation of the teleadapter 10 can be controlled by a microprocessor 11a through a control bus 10a. A memory 11b connected to the microprocessor 11a may be used for storing dialed connection codes, program code, temporary data, and any other information required during operation.

Figure 3:
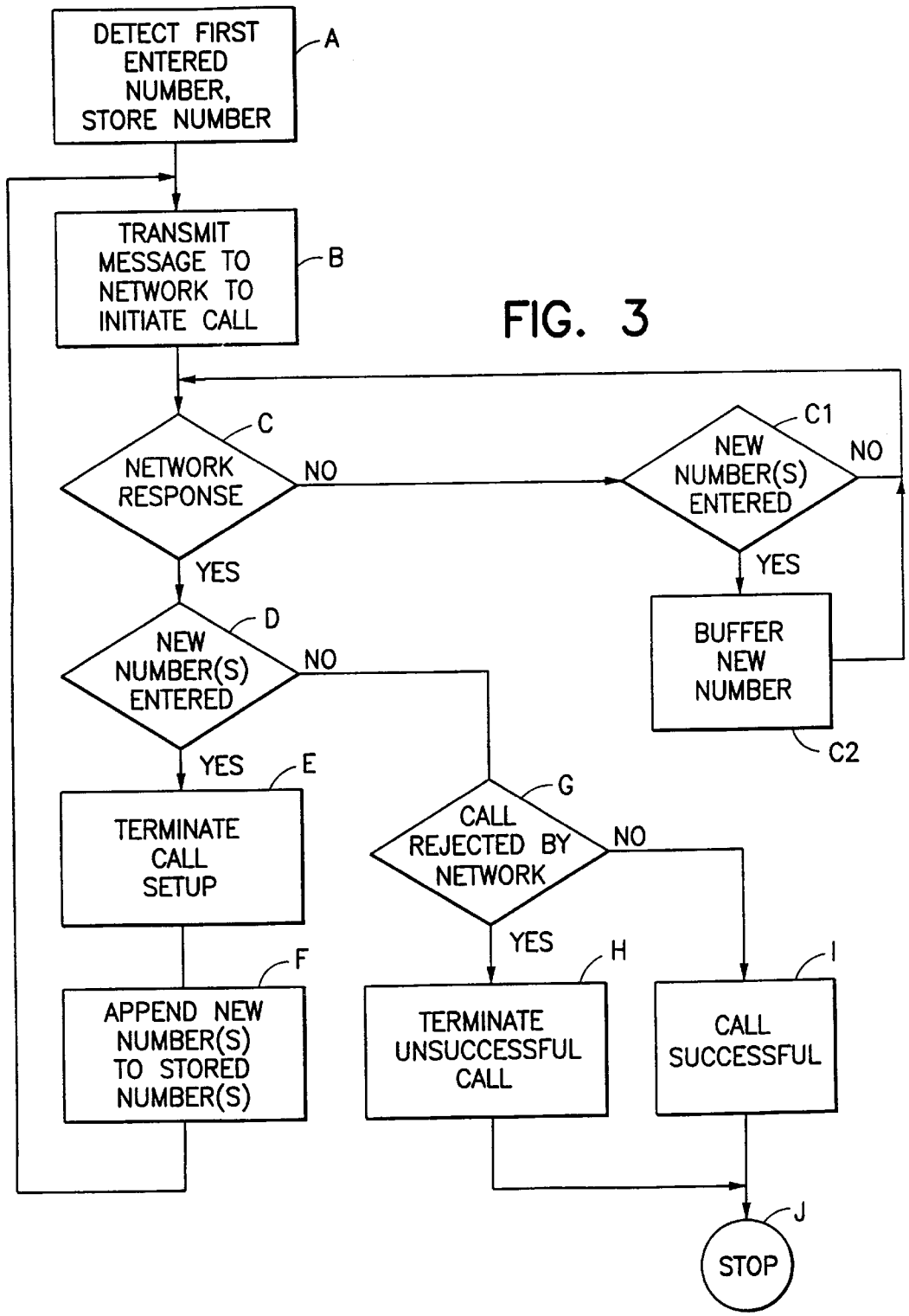
FIG. 3 is a logic flow diagram that illustrates a method in accordance with this invention.

Reference is now made to FIG. 3 for illustrating a presently preferred embodiment of this invention. At Block A user of the telephone 2 goes off-hook, the teleadapter 10 detects the off-hook and generates a dial tone, and the user dials a first number of a telephone number in order to initiate or originate a telephone call. The first dialed number or digit is passed through the teleadapter 10, is detected by the processor 11a, and is stored in a portion of the memory 11b that is reserved for a dialed telephone number.

In accordance with this invention the WLL subscriber station 1, upon detecting the first dialed digit, immediately transmits a call originate or setup message to the base station 5 to initiate the call (Block B). That is, no intentional timeout delay is introduced. The call setup message is transmitted, using the signalling protocol of the applicable air interface, through the RF circuitry 11f and the antenna 8, and is received by the base station 5 and forwarded to the exchange 7. At Block C the processor 11a tests for a response from the network. If the network response is not received the processor tests at Block C1 for another entered telephone number digit. If no new number is detected control passes back to Block C. If a new number is detected at Block C1 the new number is buffered at Block C2, and control passes back to Block C. When the response is received from the network control passes to Block D to determine if any additional number or numbers have been input since the message was transmitted at Block B. If Yes at Block D, control passes to Block E where the processor 11a terminates the current call setup, regardless of the network response, and at Block F appends the newly dialed number or numbers to the previously stored number (or numbers, depending on whether or not this is the first pass through the loop). Control then passes back to Block B to transmit another message to the network to initiate or originate the call. This origination message includes a called party telephone number portion that includes the first inputted digit plus any digit or digits that were appended at Block F. The telephone number may or may not be complete at this point.

Returning to Block D, if it is determined after the network response is received that no new number or numbers were entered by the user, control passes to Block G to determine if the network response received at Block C indicates that the call has been rejected by the network. If Yes, control passes first to Block H where the unsuccessful call is terminated, and then to Block J to terminate the method. If the network response instead indicates at Block G that the call was accepted by the network, control passes instead to Block I so as to operate the WLL subscriber station 1 to handle the successfully placed call. At call termination of the successful call control passes to Block J to terminate the method.

A minimum of two passes through the loop are required in order to successfully establish the user's telephone call. The first pass transmits the call setup request with only the first digit dialed by the user. Depending on the speed at which the user dials, the number of digits in the dialed number, and the response time of the network, the second call setup request is transmitted either with the complete telephone number, or with an incomplete telephone number. If the telephone number is incomplete, the call request will be rejected a second time by the network, by which time the user will most likely have completed dialing the number. If not, a further pass through the loop is required.

EXAMPLE

Assume for this example that a user begins to dial the number 555-1212.

When the first 5 is dialed a first call setup request message is transmitted to the base station 5 at Block B. The called party telephone number portion of the first call setup request message contains only the digit 5.

While waiting for the response from the network the user dials the second through sixth digits (i.e., 55121), but does not complete dialing the number. After the network response is received at Block C, the decision at Block D will be Yes, and the second call setup request message is transmitted to the base station 5. The called party telephone number portion of the second call setup request message includes the originally dialed digit 5, with the digits 55121 appended thereto.

While waiting for the response from the network the user dials the final digit (2). After the network response is received at Block C, the decision at Block D will again be Yes, and the third call setup request message is transmitted to the base station 5 at Block B. The called party telephone number portion of the third call setup request message includes the first and subsequently dialed digits 555121, with the last dialed 2 appended thereto (i.e., 5551212).

Assuming that this is a complete and valid telephone number that can be used to establish a call, after receiving the third network response at Block C the determination at Block D is No (since the user has completed dialing), and the determination at Block G will be No (i.e., the call is not rejected by the network).

One suitable embodiment of call setup messages (mobile originated), and related signalling, can be found in GSM 04.08, sections 7.3.2, and in the FIGS. 7.10a, 7.10b, 7.10c.

Another suitable embodiment of call set messages (mobile originated), and related signalling, can be found in IS-136, Rev. A, section 6.3.5, in conjunction with the Origination message defined in section 6.4.4.7. The mobile originated messages are sent by the WLL subscriber station 1, since to the base station 5 the WLL subscriber station 1 may appear as just another mobile phone or terminal.

One aspect of this invention is that the method ignores successful calls to an invalid number if the user has not ended the dialing procedure. The successful calls to an invalid number result in, for example, recorded voice messages that may be received from the network, such as a recorded voice message indicating that the dialed number is not a valid number, or that no circuits are available to handle the call, etc. The method of this invention is responsive to the dialing procedure and signalling received from the base station 5 which indicates whether the call was successfully or unsuccessfully established. Whether successful or unsuccessful, the call origination is terminated at Block E if one or more additional telephone number digits have been entered by the user, and is also terminated at Block G if the return signalling indicates that the complete number was rejected by the network (for whatever reason).

The teaching of this invention can also be used in conjunction with a system such as that described in the previously referenced Finnish patent application FI 961330, as well as to supplement other types of WLL call setup techniques.

The teaching of this invention is not limited for use in connecting voice-only calls, but can also be used to establish data connections. By example, the telephone 2 may be a part of a facsimile machine. Also, a dialed telephone number need not be manually dialed. For example, the number may be dialed as a result of an activation of a speed dial or a re-dial feature of the telephone 2.

It should also be realized that some of the steps shown in FIG. 3 could be executed in other than the order shown, while still achieving the same or substantially the same result. Also, other steps could be added or steps could be deleted or combined. By example, step F could be eliminated if the processor 11a were to automatically append newly entered digits to the stored digit(s) as they are received at Block C2, and to set a flag indicating the receipt of at least one further digit while waiting for the network response.

Thus, while the invention has been particularly shown and described with respect to preferred embodiments thereof, it will be understood by those skilled in the art that changes in form and details may be made therein without departing from the scope and spirit of the invention.

What is claimed is:

1. A method for establishing a call from a telephone that forms a part of a WLL subscriber unit, comprising the steps of:

dialing a first digit of a telephone number;

detecting the first digit and, in response to detecting the first digit, automatically transmitting a message over an RF channel, the transmitted message being a call origination message having a telephone number portion that contains only the first dialed digit;

waiting for a response from a network;

when the response is received, determining if at least one additional digit has been dialed; and if yes, transmitting a further message over the RF channel, the transmitted further message being another call origination message having a telephone number portion that contains the first dialed digit and the at least one additional dialed digit that is appended to the first dialed digit.

2. A method as in claim 1, wherein when the network response is received, and if the step of determining if at least one additional digit has been dialed is negative, the method includes the further steps of:

determining if the network has accepted the call origination message or rejected the call origination message;

if the call origination message is rejected, terminating the call establishment; and if the call origination message is accepted, operating the WLL subscriber unit to connect the call between a user and the called party.

3. A method for establishing a call from a telephone that forms a part of a wireless subscriber unit, comprising the steps of:

(a) inputting a first digit of a telephone number;

(b) in response to the first digit being inputted, storing the first digit in a memory location and automatically transmitting a call origination message over an RF channel to a base station connected to a telecommunications network, the call origination message having a called party telephone number portion that contains only the first digit;

(c) waiting for a response from the telecommunications network to be received via the base station;

(d) when the response is received, determining if at least one additional digit has been inputted;

(e) if yes, appending the at least one additional digit to the first digit and transmitting another call origination message to the base station, the another call origination message having a called party telephone number portion that contains the first dialed digit and the at least one additional digit that is appended to the first digit; and (f) returning to step (c), and continuing to execute steps (c)–(f) until the determination at step (d) is no, at which time the method further includes the steps of, (g) determining if the telecommunications network has accepted the call origination message or rejected the call origination message;

(h) if the call origination is rejected, terminating the call establishment; else (i) if the call origination message is accepted, operating the WLL subscriber unit to connect the telephone with the called party.

4. A WLL subscriber unit, comprising:

a telephone including means for dialing a telephone number;

a radio transceiver and controller;

a memory coupled to said controller; and an adapter interposed between said telephone and said radio transceiver and controller;

wherein said controller is responsive to a receipt of a first dialed digit of a telephone number for storing the first dialed digit in said memory and for automatically composing and transmitting a message over an RF channel through said transceiver without regard for the value of the first dialed digit and without requiring that a predetermined timeout delay occur, the transmitted message being a call origination message having a called party telephone number portion that contains only the first dialed digit.

5. A WLL subscriber unit, comprising:

a telephone including means for dialing a telephone number;

a radio transceiver and controller;

a memory coupled to said controller; and an adapter interposed between said telephone and said radio transceiver and controller;

wherein said controller is responsive to a receipt of a first dialed digit of a telephone number for storing the first dialed digit in said memory and for automatically composing and transmitting a message over an RF channel through said transceiver, the transmitted message being a call origination message having a called party telephone number portion that contains only the first dialed digit; and wherein said controller is responsive to receiving a response to the transmitted message through said transceiver for determining if at least one additional digit has been dialed and, if yes, for transmitting a further message over the RF channel, the transmitted further message being another call origination message having a called party telephone number portion that contains the first dialed digit and the at least one additional dialed digit that is appended to the first dialed digit.

6. A WLL subscriber unit as in claim 5, wherein when the response is received, and if the controller determines that at least one additional digit has not been dialed, the controller operates to determine if the call origination message has been accepted, in which case the controller operates to connect the call between said telephone and said transceiver, or if the call origination message has been rejected, in which case the controller operates to terminate the call establishment.

* * * * *